Dec. 16, 1924.

J. N. GOULD

CLOTHES WRINGER

Filed Sept. 2, 1921 2 Sheets-Sheet 1

John N. Gould, Inventor

By Staley W Bowman, Attorneys

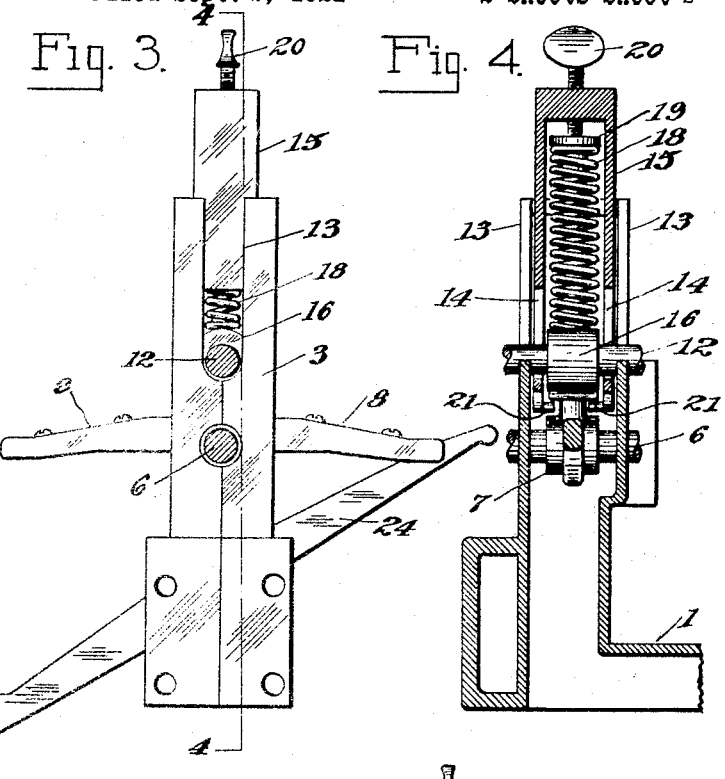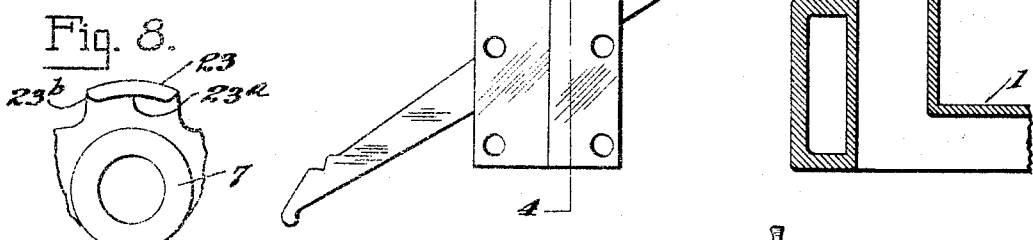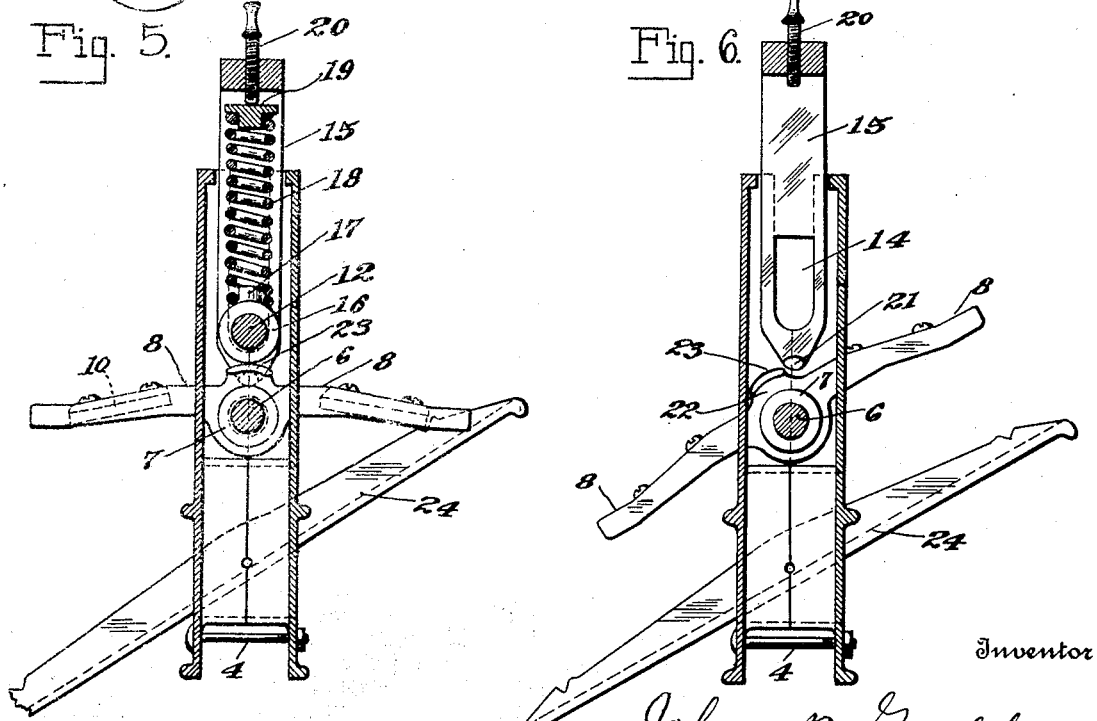

Patented Dec. 16, 1924.

1,519,251

UNITED STATES PATENT OFFICE.

JOHN N. GOULD, OF FREDERICKTOWN, OHIO, ASSIGNOR TO THE J. B. FOOTE FOUNDRY COMPANY, OF FREDERICKTOWN, OHIO, A CORPORATION OF OHIO.

CLOTHES WRINGER.

Application filed September 2, 1921. Serial No. 497,904.

*To all whom it may concern:*

Be it known that I, JOHN N. GOULD, a citizen of the United States, residing at Fredericktown, in the county of Knox and State of Ohio, have invented certain new and useful Improvements in Clothes Wringers, of which the following is a specification.

My invention relates to improvements in clothes wringers, it particularly relating to a wringer of the quick releasable type.

An object of my invention is to devise a wringer which will be simple in construction, economical in manufacture and effective in operation.

A further and more specific object of the invention is to provide for utilizing the feed board of the wringer for applying tension to the rolls and for quickly releasing the tension.

In the accompanying drawings:—

Fig. 3 is an end elevation.

Fig. 4 is a section on the line 4—4 of Fig. 3.

Fig. 5 is a section on the line 5—5 of Fig. 1.

Fig. 6 is a section similar to Fig. 5 with some of the parts removed showing the feed board in releasing position.

Fig. 7 is an enlarged detail of the interengaging parts between the feed board and spring cage.

Fig. 8 is a fragmentary portion of the feed board.

Figure 1:
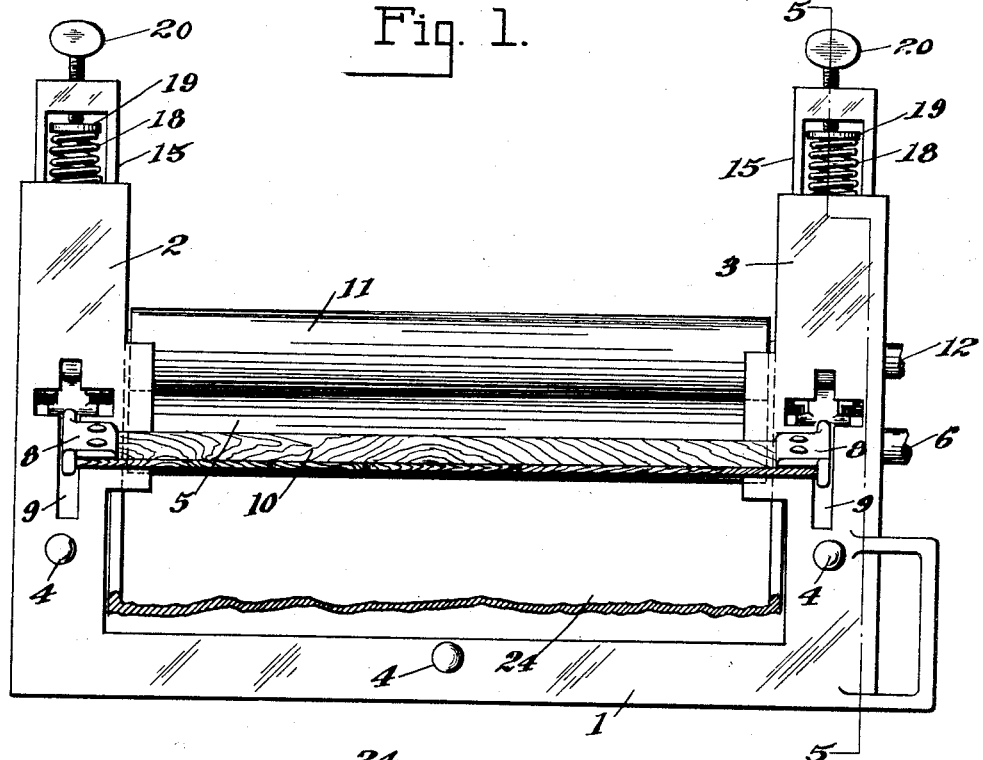
Fig. 1 is a side elevation.
Figure 2:
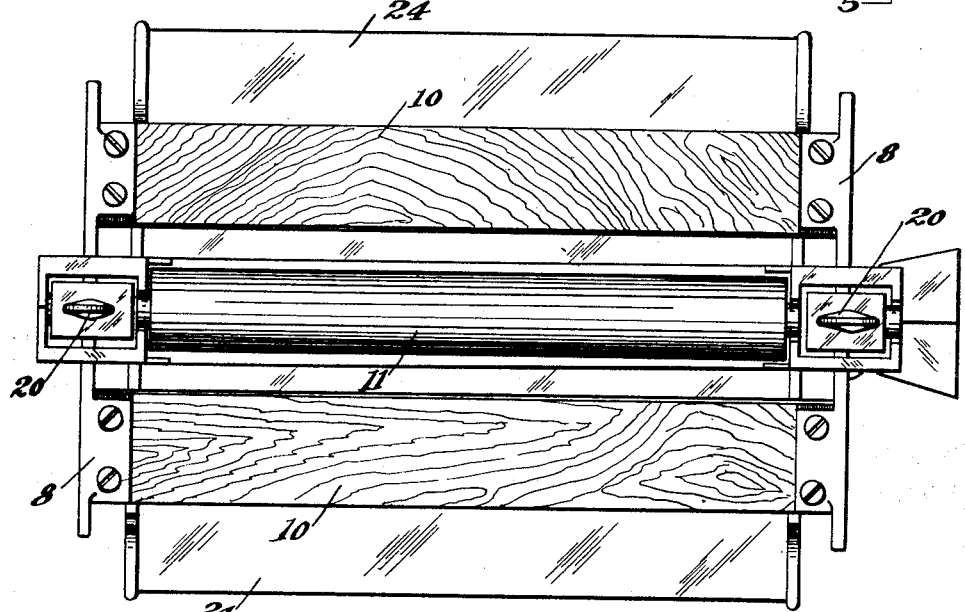
Fig. 2 is a top plan view.

Referring to the drawings, 1 represents the base of the frame having at each end an upwardly extending open-top housing, 2 and 3, preferably formed integrally therewith; the base and its housings being preferably formed in halves secured together by bolts 4.

The lower roll 5 of the wringer has its shaft 6 projected through openings in the inner walls of the housings and loosely mounted upon the ends of this shaft within the housings are the hubs 7 of two lever members, the arms 8 of each of which project in opposite directions through slotted openings 9 in the front and rear walls of the housings and have secured thereto wooden strips 10; these levers and the connecting strips constituting the feed board of the wringer. These hubs act as bearings for the lower roll when the machine is in operation.

The upper roll 11 has the respective ends of its shaft 12 projecting through slotted openings 13 in the inner side walls of the respective housings and also through slotted openings 14 of a spring cage 15, slidably mounted in each housing. This shaft, as well as the shaft of the lower roll, is also projected through one of the outer side wall of the housing 3, as shown in Fig. 1, so as to be equipped with the usual driving gears (not shown). Each end of the shaft 12 is journaled in a floating bearing 16 located in the lower end of the corresponding spring cage having an upwardly projecting boss 17 to receive the lower end of a coil spring 18, the upper end of the spring receiving the boss of a plate 19 which is engaged by a thumb-screw 20 threaded in the upper end of the cage 15 whereby the tension of the spring may be adjusted. Each cage 15 has side walls but is preferably open at the front and rear and the extreme lower end of each of these side walls is provided with an inwardly projecting lug 21 having rounded upper surface. The hub of each of the feed board levers has an enlargement or boss 22 projecting upwardly with the upper edge thereof provided with laterally-extending curved projections 23, the under surface of which is provided with a central, rounded, shallow recess 23ª, the approaches to which are inclined, as indicated at 23ᵇ.

In operation, the feed board is swung to a horizontal position to cause the bevelled projections 23 to ride over the projections 21 of the spring cage and lock the same against upward movement as shown in Fig. 5, thus confining the spring between the upper roll and the top of the spring cage so that any upward movement of the upper roll will be against the tension of the springs. To quickly release the upper roll, the board will be tilted to either side such as shown in Fig. 6 to cause the projections 23 to ride off the projections 21 which releases the spring cages and relieves the tension of the springs.

A water drain board 24 is pivotally connected with the walls of the housings beneath the feed board and can be swung to one side or the other to receive the drippings from the rolls.

Having thus described my invention, I claim:—

1. In a wringer of the character described, a main frame having end housings, a stationary roll having its shaft carried in the walls of said housing, a movable roll also having its shaft carried in the walls of said housing, a spring cage located in each housing with a spring between the upper end thereof and the shaft of the movable roll, a pivoted feed board arranged on the shaft of the stationary roll, and interengaging parts between said feed board and said cages for confining said cages against movement when said board is in normal working position and releasing said cages when said board is tilted out of normal position.

2. In a wringer of the character described, a main frame having end housings, a stationary roll having its shaft supported in the walls of said housings, a movable roll, movable bearings in said housings for said movable roll, a spring cage located in each housing with a spring therein located between the upper end of the cage and the bearing of the movable roll, a pivoted feed board arranged on the shaft of the stationary roll and arranged to act as a bearing for said roll and interengaging parts between said feed board and said cages for confining said cages against movement when said board is in normally working position and releasing said cages when said board is tilted out of normal position.

3. In a wringer, a frame, a lower roll confined against vertical movement in said frame, an upper roll, a vertically movable spring supporting member at each end of said roll, a coil spring pressed by each supporting member against the upper roll, said springs being confined at their upper ends by said supporting members and normally arranged to exert pressure at their lower ends upon said upper roll, a movable manually operated device, and interengaging means between the lower end of said spring supporting members and said manually-operated device whereby, when said device is moved to one position, said supporting members are engaged therewith to apply pressure to said springs and when said device is moved to another position said supporting members are entirely released therefrom to relieve the upper roll from the pressure of said springs.

In testimony whereof, I have hereunto set my hand this 29th day of August. 1921.

JOHN N. GOULD.